United States Patent [19]

Vannini et al.

[11] 3,928,780
[45] Dec. 23, 1975

[54] ANGULAR VELOCITY DETECROT ARRANGEMENT FOR A VEHICLE WHEEL, PARTICULARLY FOR AN ANTI-SKID BRAKE SYSTEM

[75] Inventors: Paolo Vannini, turin; Luigi Anselmino; Giuseppe Frazzini, both of Turin, all of Italy

[73] Assignee: Fiat Societa per Azioni, Turin, Italy

[22] Filed: June 25, 1974

[21] Appl. No.: 482,944

[30] Foreign Application Priority Data
June 25, 1973 Italy .................................. 68883/73

[52] U.S. Cl. .............................. 310/168; 310/168 X
[51] Int. Cl.² ........................................ H02K 21/38
[58] Field of Search .............. 310/67, 168, 155, 156

[56] References Cited
UNITED STATES PATENTS

| | | | |
|---|---|---|---|
| 3,596,122 | 7/1971 | Stewart | 310/67 |
| 3,600,617 | 8/1971 | Frayer | 310/156 |
| 3,678,386 | 7/1972 | Miles | 310/67 X |
| 3,760,210 | 9/1973 | Abate | 310/168 |
| 3,772,550 | 11/1973 | Anselmino | 310/168 |
| 3,887,046 | 6/1975 | Bueler | 310/168 X |

*Primary Examiner*—Donovan F. Duggan
*Attorney, Agent, or Firm*—Sughrue, Rothwell, Mion, Zinn & Macpeak

[57] ABSTRACT

An electromagnetic angular velocity transducer assembly for a vehicle wheel of the type comprising a toothed tone wheel interacting magnetically with an electromagnetic pick up, in which the toothed wheel is attached to the vehicle wheel and the pick up is carried on a flange formed on a nut securing the outer bearing of the wheel on the axle of a vehicle. The axle has an axial bore therein housing a cable the ends of the leads of which are connected to terminal posts set into a resilient plug in the end of the bore. The output leads from the pick up are connected to these terminal posts.

3 Claims, 1 Drawing Figure

U.S. Patent   Dec. 23, 1975   3,928,780
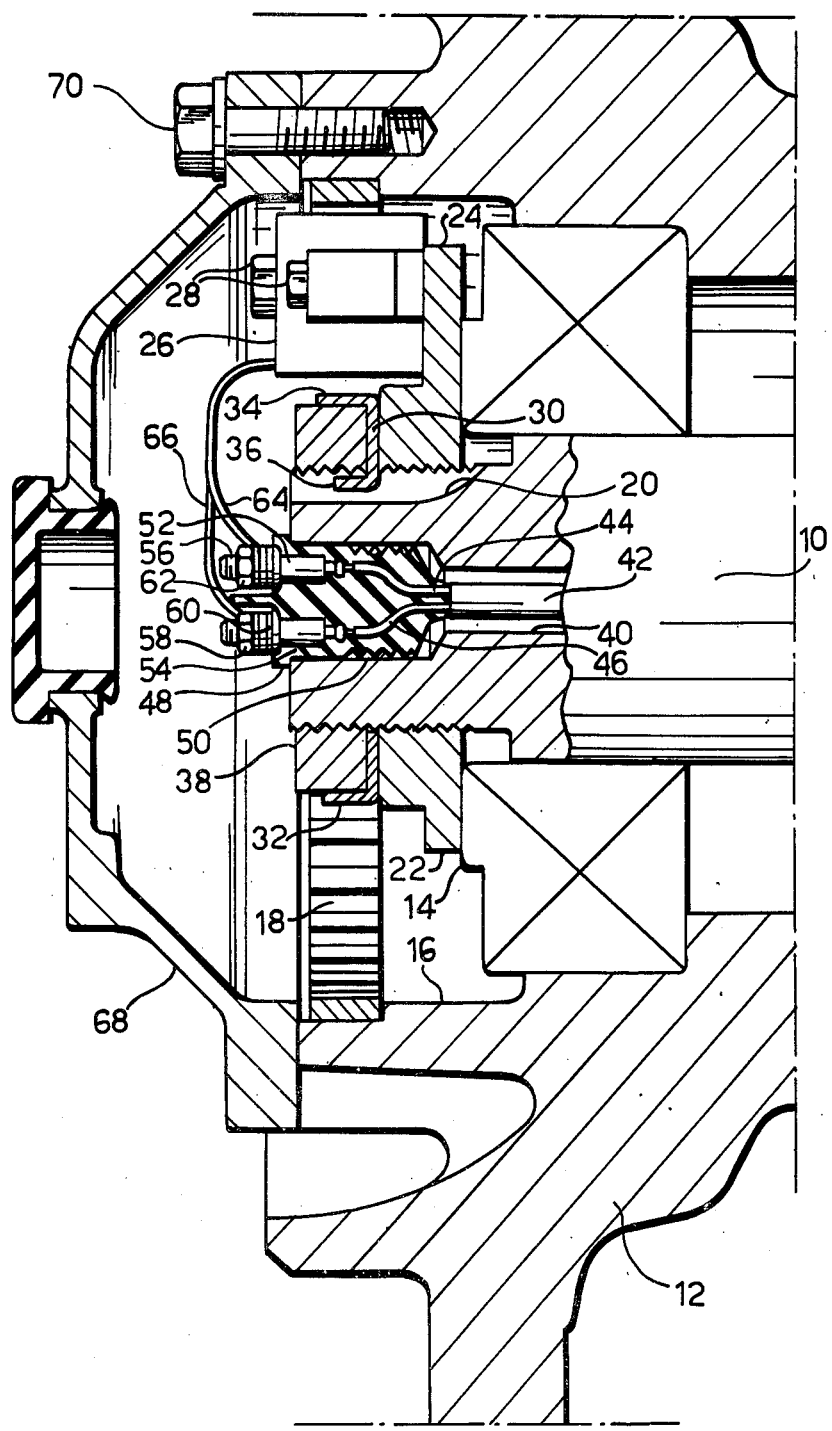

ANGULAR VELOCITY DETECROT ARRANGEMENT FOR A VEHICLE WHEEL, PARTICULARLY FOR AN ANTI-SKID BRAKE SYSTEM

BACKGROUND AND OBJECT OF THE INVENTION

The present invention relates to an angular velocity detector arrangement for a vehicle wheel particularly for an anti-skid brake system.

The invention particularly concerns the mounting of a toothed wheel and an electromagnetic pick-up of the arrangement outside the brake drum of the wheel; arrangements which are mounted in this way are especially advantageous in that they avoid soiling of the parts thereof by grease and allow access to the sensor without preliminary dismantling of the vehicle wheel and the brake drum.

The object of the present invention seeks to provide a mounting arrangement for a toothed wheel and electromagnetic pick-up which is especially simple and which requires only a small number of parts.

SUMMARY OF THE INVENTION

According to the present invention an angular velocity detector arrangement for a vehicle wheel, particularly for anti-skid brake systems, of the type comprising a toothed wheel fixed to the vehicle wheel, and cooperating with a fixed electromagnetic pick-up device, is characterised in that the pick-up device is supported by a nut which secures the outer bearing of the vehicle wheel, and the said nut is secured by a threaded bush with a locking washer, in that the said toothed wheel is carried on the vehicle wheel itself for cooperation with the said pick-up and in that the output leads from the pick-up are connected to two terminals incorporated within a plug of elastomeric material, the terminals being connected to two leads of a cable housed in a bore in the wheel axle.

A major advantage of embodiments of this invention is that they can be made in such a way that very narrow tolerances on the components and upon assembly are not necessary whilst nevertheless providing a constant spacing between the toothed wheel and the electromagnetic pick-up device upon assembly.

In addition it is possible with embodiments of the present invention to effect assembly of the toothed wheel without requiring calipers or other special tools, and a sealed connection can be made between the output leads of the electromagnetic pick-up device and the leads which carry the information to the subsequent processing circuits, both simply and speedily.

Various other features and advantages of the invention will become apparent from the following description with reference to the accompanying drawing which is provided purely by way of non-restrictive example.

BRIEF DESCRIPTION OF THE DRAWING

The single FIGURE of the drawing is a longitudinal section of one end of an axle of a vehicle with a part of the corresponding wheel and an angular velocity detector arrangement for the wheel, formed as an embodiment of the invention.

DESCRIPTION OF THE PREFERRED EMBODIMENT

In the drawing, there is shown an axle 10 of a vehicle (not illustrated) upon which a wheel 12 is rotatably mounted by means of rolling element bearings; the outer bearing is indicated 14. On the inside of the hub 16 of the wheel 12 there are formed a plurality of radially inwardly directed teeth 18. These may be formed directly by casting, by a subsequent milling operation, with added ferromagnetic material or by sintered material. The end of the axle 10 has a groove 20, for purposes which will be described below.

The bearing 14 is held in place by a fixing nut 22 which has an asymmetrical enlarged plate-like part 24 projecting radially from the face which engages the bearings 14; the plate-like part 24 supports an electromagnetic pick-up 26, which can be of any type, which is secured thereto by means of bolts 28 passing through enlarged eyes or slots in the plate-like part 24, for positioning and adjustment of the pick-up in relation to the tone wheel after the nut 22 has been screwed on to the axle. After the nut 22 has been screwed on, a washer 30 having outer peripheral tabs 32, 34, and a radially inwardly projecting tab 36 is fitted over the end of the axles. The tab 36 engages in the groove 20 and thus prevents rotation of the washer about the axle. A threaded bush 38 is then screwed on to the axle and, in order to secure it in place the tabs 32, 34 are bent over to engage it; obviously the number of tabs and their position may be varied so as to be able to lock the nut 22 also, if desired.

The axle 10 is provided with an axial hole 40, through which extends a cable 42 which includes two leads 44, 46 which are connected to subsequent processing circuits (not shown). The end of the cable 42 is embedded in a plug 48, of rubber or other elastomeric material, which is housed in a widened portion 50 of the hole 40 at the free end of the axle 10. In the rubber plug there are also embedded two connectors 52, 54 which are electrically connected to the ends of the leads 44, 46. The connectors 52, 54 have respective terminal posts 56, 58 to which, by means of washers 60 and nuts 62, are connected respective leads 64, 66 from the pick-up 26. The whole assembly is protected by a cover 68 fixed to the hub 16 by means of set screws 70.

We claim:

1. In an angular velocity detector assembly for a vehicle wheel having a hub mounted on an axle by inner and outer bearings, the outer bearing of which is secured in position by a nut threaded on the end of said axle, said detector assembly comprising a toothed wheel fixed to the vehicle wheel and a fixed electromagnetic pick-up device cooperating magnetically with said toothed wheel, the improvement comprising said pick-up device being supported by said nut which secures said outer bearing for said vehicle wheel on said axle, a threaded bush having a locking washer securing said nut in position on said axle, said toothed wheel being carried directly on said hub of said vehicle wheel concentric with said axle and disposed radially outwardly of said pick-up device for cooperation with said pick-up, an axial bore in said axle, a plug of elastomer material incorporating two terminal connectors, said plug being housed in said bore in said axle, a cable having two leads extending through said bore in said axle and output leads from said pick-up, said leads being connected to said two terminals in said plugs of elastomeric material.

2. In an angular velocity detector assembly as set forth in claim 1 wherein said toothed wheel is comprised of a plurality of teeth formed directly in the material of said hub.

3. In an angular velocity detector assembly as set forth in claim 1 wherein said toothed wheel is comprised of a separate metalic ring secured to said hub.

* * * * *